United States Patent
Grizzle

(10) Patent No.: US 9,121,420 B2
(45) Date of Patent: Sep. 1, 2015

(54) LINEAR BUSHING AND BUSHING HOUSING ASSEMBLIES AND METHODS

(71) Applicant: Edward R Grizzle, Royston, GA (US)

(72) Inventor: Edward R Grizzle, Royston, GA (US)

( * ) Notice: Subject to any disclaimer, the term of this patent is extended or adjusted under 35 U.S.C. 154(b) by 0 days.

(21) Appl. No.: 14/091,945

(22) Filed: Nov. 27, 2013

(65) Prior Publication Data
US 2015/0143661 A1    May 28, 2015

(51) Int. Cl.
*F16B 1/00*    (2006.01)

(52) U.S. Cl.
CPC ... *F16B 1/00* (2013.01); *Y10T 16/05* (2015.01)

(58) Field of Classification Search
CPC ..... Y10T 16/05; Y10T 16/063; Y10T 16/088; Y10T 24/44282; Y10T 24/4453; Y10T 24/44538; D05B 3/00; D05B 55/02; D05C 11/04; F16L 3/1075; F16L 5/00; F16L 21/06; F16L 21/065; F16L 23/032; F16L 23/04; F16B 1/00
USPC ............. 16/2.1, 2.2, 2.5; 248/316.5; 285/407, 285/411, 415, 420; 24/489, 517, 518; 112/226
See application file for complete search history.

(56) References Cited

U.S. PATENT DOCUMENTS

| | | | | |
|---|---|---|---|---|
| 1,928,316 A | * | 9/1933 | Muto | 285/373 |
| 3,330,354 A | * | 7/1967 | Chamblee | 166/313 |
| 5,330,233 A | * | 7/1994 | Kress | 285/9.2 |
| 6,533,333 B1 | * | 3/2003 | Radzik | 285/367 |
| 8,328,457 B2 | * | 12/2012 | Werth | 403/289 |
| 2009/0020055 A1 | * | 1/2009 | Hillenbrand et al. | 112/226 |
| 2012/0181047 A1 | * | 7/2012 | Sugden | 166/380 |
| 2012/0227221 A1 | * | 9/2012 | Whitaker et al. | 24/459 |
| 2013/0249212 A1 | * | 9/2013 | McKiernan | 285/407 |

* cited by examiner

*Primary Examiner* — William Miller
(74) *Attorney, Agent, or Firm* — Meunier Carlin & Curfman LLC

(57) ABSTRACT

Various implementations include a linear bushing and a bushing housing assembly that allows the linear bushing to be accessed and replaced without removing the bushing housing assembly from a machine in which it is installed. In particular, the assembly includes a hinged bushing housing that opens to allow removal and replacement of the linear bushing. The housing also provides for easy alignment and secure placement of the linear bushing and is more easily accessible to an operator than current bushings and bushing housings. Thread or other fibers may be run through the bushing's longitudinal channel, which serves as a guide for the thread or fibers. In addition, the bushing and housing assembly may be installed in a textile machine or other types of machines that use linear bushings.

15 Claims, 2 Drawing Sheets

LINEAR BUSHING AND BUSHING HOUSING ASSEMBLIES AND METHODS

BACKGROUND

Linear bushings are used in textile equipment to guide threads and fibers through the textile equipment. The linear bushings may include straight cylindrical bushings and split bushings, which have a longitudinal split extending along the length thereof. Bushings are typically installed in a housing that is installed within a textile machine to keep the bushings in the appropriate orientation and prevent inadvertent movement.

Current bushing housing assemblies are typically formed as one piece or in two pieces. For current one piece housings, the operator may have to remove or replace the housing when the bushing wears out if the bushing is not removable from the housing. For current two piece housings, the separate portions are typically held together by screws, which require the operator to remove the housing to access the screws or require the screws to be accessed through tight spaces in the machine. This can be very cumbersome and time consuming.

Accordingly, an improved housing and bushing assembly are needed.

BRIEF SUMMARY

Various implementations include a linear bushing and a bushing housing assembly that allows the linear bushing to be replaced without removing the bushing housing assembly from the machine. In particular, the assembly includes a hinged bushing housing that opens to allow removal and replacement of the linear bushing. The housing also provides for easy alignment and secure placement of the linear bushing.

According to various implementations, a linear bushing and bushing housing assembly includes a linear bushing and a bushing housing. The linear bushing has an exterior wall and an interior wall, and the interior wall defines a longitudinal channel. The bushing housing includes a first housing block and a second housing block. Each housing block defines a longitudinal bushing receiving channel. The first and second housing blocks include hinge connection portions that are configured for hingedly connecting the housing blocks relative to each other. The first and second housing blocks are moveable between an open position and a closed position about the hinge connection portions. The exterior wall of the linear bushing is enclosed within the longitudinal bushing receiving channels of the first and second housing blocks when the housing blocks are in the closed position. In one implementation, the hinge connection portions are disposed on a first side of the longitudinal bushing receiving channel of each of the first and second housing blocks. For example, the hinge connection portions may include a tongue extending from a first side of the second housing block and a groove defined within a first side of the first housing block. The groove is configured for receiving the tongue, and a pin extends axially through the tongue, the groove, and at least a portion of the second housing block adjacent each side of the groove such that the first and second housing blocks are rotatable about the pin between the closed and open positions. The hinge connection portions may be integrally formed with the first and second housing blocks.

In one implementation, the linear bushing includes at least one flange that extends substantially radially outwardly from the exterior surface of the bushing. The first and second housing blocks each define flange receiving surfaces on a second side of each longitudinal bushing receiving channel. The second sides are opposite the first sides relative to a longitudinal axis that extends along a length of each longitudinal bushing receiving channel. The flange receiving surfaces of the first and second housing blocks are configured for abutting at least a portion of the flange when the housing blocks are in the closed position.

The flange receiving surface of the first housing block may also include a male detent that extends generally upwardly from the flange receiving surface. In addition, the flange receiving surface of the second housing block may define a female depression configured for receiving the male detent when the housing blocks are in the closed position. In one such implementation, the flange may include two flanges that are spaced apart to define a channel there between, and the male detent is configured for extending through the channel between the flanges. Or, in an alternative implementation, the flange may define an opening that is configured for receiving the male detent there through.

In certain implementations, at least one of the first or second housing blocks may include a latching mechanism that is configured for securing the first and second housing blocks in the closed position. For example, the latching mechanism may include a notched arm and a restraint. The notched arm may be disposed on one of the first or second housing block, and the restraint may be disposed on the other of the first or second housing block. The restraint is configured for receiving and engaging the notched arm when the housing blocks are in the closed position. The notched arm may be rotatably attached to an exterior surface of the first or second housing block.

Other implementations include a method of assembling a linear bushing and bushing housing. The method includes: (1) providing a linear bushing having an exterior wall and an interior wall, the interior wall defining a longitudinal channel; (2) providing a bushing housing that includes: (a) a first housing block and a second housing block, each housing block defining a longitudinal bushing receiving channel, and (b) hinge connection portions configured for hingedly connecting the housing blocks relative to each other, wherein the first and second housing blocks are moveable between an open position and a closed position about the hinge connection portions; (3) disposing the exterior wall of the linear bushing within the longitudinal bushing receiving channel of one of the first and second housing blocks when the housing blocks are in the open position; and (4) rotating the first and second housing blocks about the hinged connection portions to position the first and second housing blocks in the closed position. In certain implementations, the method also includes securing the first housing block and the second housing block into the closed position after rotating the housing blocks.

In a particular implementation, the linear bushing includes two flanges that project radially outwardly from the exterior wall of the bushing. The flanges are spaced apart to define a channel there between. The hinge connection portions are disposed on a first side of the longitudinal bushing receiving channel of each of the first and second housing blocks, and flange receiving surfaces are defined on a second side of each longitudinal bushing receiving channel. The second side of one of the first or second housing blocks includes a male detent extending upwardly there from. The method further includes aligning the male detent to extend into the channel prior to rotating the housing blocks to the closed position.

DESCRIPTION OF THE DRAWINGS

The components in the drawings are not necessarily to scale relative to each other. Like reference numerals designate corresponding parts throughout the several views.

DETAILED DESCRIPTION

Various implementations include a linear bushing and a bushing housing assembly that allows the linear bushing to be accessed and replaced without removing the bushing housing assembly from the machine in which it is installed. In particular, the assembly includes a hinged bushing housing that opens to allow removal and replacement of the linear bushing. The housing also provides for easy alignment and secure placement of the linear bushing and is more easily accessible to an operator than current bushings and bushing housings. Thread or other fibers may be run through the bushing's longitudinal channel, which serves as a guide for the thread or fibers. In addition, the bushing and housing assembly may be installed in a textile machine or other types of machines that use linear bushings.

Figure 1:
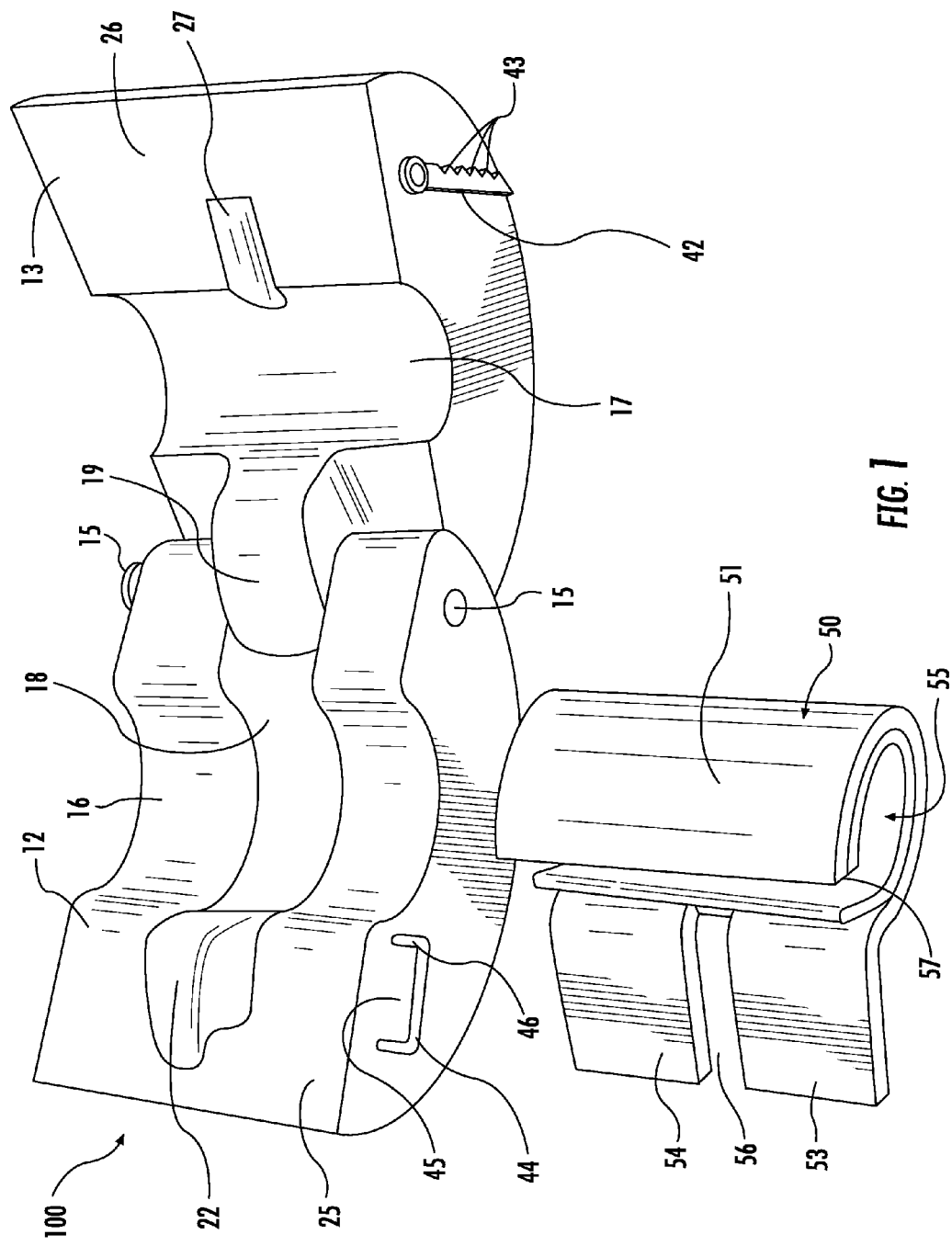
FIG. 1 illustrates a perspective view of the linear bushing and bushing housing assembly according to one implementation.

FIG. 1 illustrates a linear bushing and bushing housing assembly 100 according to one implementation. The assembly 100 includes a linear bushing 50 and a bushing housing 10. The linear bushing 50 has an exterior wall 51 and an interior wall 55, and the interior wall 55 defines a longitudinal channel. For example, in this implementation, the channel is configured for allowing thread to run there through. The linear bushing 50 also includes two flanges 53, 54 that extend radially outwardly from the exterior wall 51 of the bushing 50. The flanges 53, 54 are spaced apart and define a channel 56 there between. In addition, the bushing 50 defines a split 57 extending longitudinally through the walls 51, 55 of the bushing 50.

The bushing housing 10 includes a first housing block 12 and a second housing block 13. Each housing block 12, 13 defines a longitudinal bushing receiving channel 16, 17, respectively. The first 12 and second housing blocks 13 also include hinge connection portions that are configured for hingedly connecting the housing blocks 12, 13 relative to each other. In particular, the hinge connection portions include a tongue 19 that extends from a first side of the second housing block 13 and a groove 18 defined within a first side of the first housing block 12. The groove 18 is configured for receiving the tongue 19, and a pin 15 extends axially through the tongue 19, the groove 18, and at least a portion of the second housing block 13 adjacent each side of the groove 18 such that the first 12 and second housing blocks 13 are rotatable about the pin 15 between a closed and an open position. As shown in FIG. 1, the tongue 19 may be integrally formed with the second housing block 13, and the groove 18 maybe integrally formed with the first housing block 12. The first 12 and second housing blocks 13 are moveable between an open position, as shown in FIG. 1, and a closed position, as shown in FIG. 2, about the pin 15.

The first 12 and second housing blocks 13 each define flange receiving surfaces 25, 26 on a second side of each longitudinal bushing receiving channel 16, 17, respectively. The second sides are opposite the first sides relative to a longitudinal axis that extends along a length of each longitudinal bushing receiving channel 16, 17. The flange receiving surfaces 25, 26 of the first 12 and second housing blocks 13 are configured for abutting at least a portion of the flanges 53, 54 when the housing blocks 12, 13 are in the closed position.

The flange receiving surface 25 of the first housing block 12 also includes a male detent 22 that extends generally upwardly from the flange receiving surface 25. In addition, the flange receiving surface 26 of the second housing block 13 defines a female depression 27 configured for receiving the male detent 22 when the housing blocks 12, 13 are in the closed position. In alternative implementations (not shown), the detent 22 may be on the second housing block 13 and the depression 27 may be on the first housing block 12.

Figure 2:
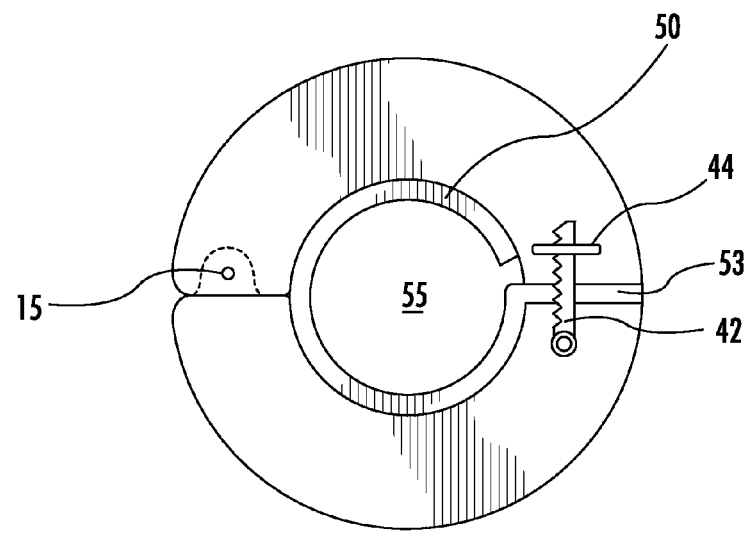
FIG. 2 illustrates an end view of the assembly shown in FIG. 1 when the bushing housing is in the closed position.

In addition, the housing blocks 12, 13 also include a latching mechanism that is configured for securing the housing blocks 12, 13 in the closed position shown in FIG. 2. In the implementation shown in FIG. 1, the latching mechanism includes a notched arm 42 and a restraint 44. The notched arm 42 is disposed on the second housing block 13 and includes a plurality of notched portions 43. The notched arm 42 is rotatably attached to an exterior surface of the second housing block 13. The restraint 44 is disposed on the first housing block 12 and defines a channel 45 through which the notched arm 42 may be thread when the blocks 12, 13 are closed. Other latching mechanisms may be used in alternative implementations.

To assemble the bushing 50 into the housing 10, the exterior wall 51 of the bushing is placed into one of the longitudinal bushing receiving channels 16, 17. The flanges 53, 54 are disposed on one of the flange receiving surfaces 25, 26 such that the channel 56 between the flanges 53, 54 is aligned with the male detent 22 or the female depression 27. The housing blocks 12, 13 are then rotated toward each other into a closed position, as shown in FIG. 2. In the closed position, the male detent 22 extends through the channel 56 between the flanges 53, 54 and engages the female depression 27. The blocks 12, 13 are then secured in the closed position by engaging the notched portions 43 of the arm 42 through the restraint 44 and against a side 46 of the restraint 44. This latching mechanism prevents unintentional movement of the housing blocks 12, 13 from the closed position to the open position.

Figure 3:
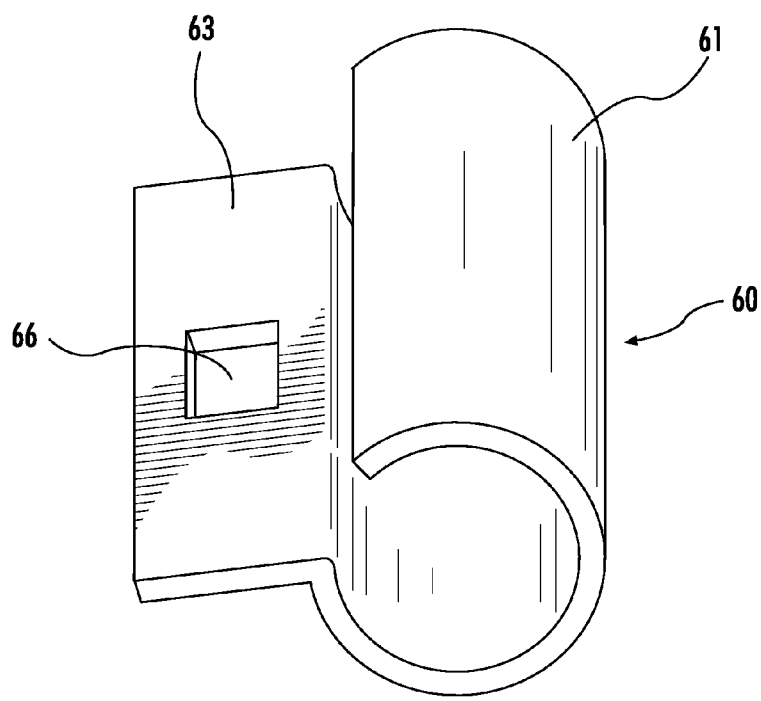
FIG. 3 illustrates a linear bushing according to an alternative implementation.

In the alternative implementation shown in FIG. 3, the bushing 60 may include one flange 63 that extends substantially radially outwardly from the exterior surface 61 thereof, and the flange 63 defines an opening 66 that is configured for receiving the male detent 22 there through.

In other alternative implementations, the housing blocks may not define a female depression 27 as shown in FIG. 1. Instead, the male detent may be sized such that the height of the male detent is not greater than the thickness of the flange (s) of the bushing. Like the implementation shown in FIGS. 1 and 2, this alternative implementation facilitates alignment of the bushing in the housing and does not interfere with the ability of the housing to close around the bushing.

In addition, in other implementations, the linear bushing may not have a flange or a split. For example, the bushing may be a split bushing without a flange, a split bushing with only one flange, a split bushing with three or more flanges, or a simple cylindrical bushing with or without one or more flanges.

The terminology used herein is for the purpose of describing particular implementations only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various implementations of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementations were chosen and described to best explain the principles of the invention and the practical application, and to enable others of ordinary skill in the art to understand the invention for various implementations with various modifications as are suited to the particular use contemplated.

The invention claimed is:

1. A linear bushing and bushing housing assembly comprising:
    a linear bushing having an exterior wall and an interior wall, the interior wall defining a longitudinal channel; and
    a bushing housing comprising:
        a first housing block and a second housing block, each housing block defining a longitudinal bushing receiving channel;
        the first and second housing blocks comprising hinge connection portions configured for hingedly connecting the housing blocks relative to each other, wherein the first and second housing blocks are moveable between an open position and a closed position about the hinge connection portions,
    wherein:
        the exterior wall of the linear bushing is enclosed within the longitudinal bushing receiving channels of the first and second housing blocks when the housing blocks are in the closed position,
        the linear bushing comprises one or more flanges that project substantially radially outwardly from the exterior wall of the bushing,
        the hinge connection portions are disposed on a first side of the longitudinal bushing receiving channel of each of the first and second housing blocks,
        the first and second housing blocks each define flange receiving surfaces on a second side of each longitudinal bushing receiving channel, the first sides being opposite the second sides relative to a longitudinal axis extending along a length of each longitudinal bushing receiving channel, and
        the flange receiving surfaces of the first and second housing blocks are configured for abutting at least a portion of the flange when the housing blocks are in the closed position.

2. The assembly of claim 1 wherein the linear bushing is a split bushing.

3. The assembly of claim 1 wherein:
    the flange receiving surface of the first housing block comprises a male detent extending generally upwardly from the flange receiving surface; and
    the flange receiving surface of the second housing block defines a female depression configured for receiving the male detent when the housing blocks are in the closed position.

4. The assembly of claim 3, wherein the flange comprises two flanges that are spaced apart to define a channel there between, and the male detent is configured for extending through the channel between the flanges.

5. The assembly of claim 3, wherein the flange defines an opening configured for receiving the male detent there through.

6. The assembly of claim 1, wherein the hinged connection portions comprise:
    a tongue extending from a first side of the second housing block;
    a groove defined within a first side of the first housing block, the groove configured for receiving said tongue; and
    a pin extending axially through the tongue, the groove, and at least a portion of the second housing block adjacent each side of the groove such that the first and second housing blocks are rotatable about the pin between the closed and open positions.

7. The assembly of claim 1 wherein the hinge connection portions are integrally formed with the first and second housing blocks.

8. The assembly of claim 1, wherein at least one of the first or second housing blocks comprises a latching mechanism, the latching mechanism configured for securing the first and second housing blocks in the closed position.

9. The assembly of claim 8, wherein the latching mechanism comprises a notched arm and a restraint, the notched arm being disposed on one of the first or second housing block and the restraint being disposed on the other of the first or second housing block, the restraint being configured for receiving and engaging the notched arm when the housing blocks are in the closed position.

10. The assembly of claim 9, wherein the notched arm is rotatably attached to an exterior surface of the first or second housing block.

11. The assembly of claim 1, wherein the linear bushing and bushing housing assembly is configured for being installed in a textile machine, and the longitudinal channel of the linear bushing is configured for having thread run there through.

12. A method of assembling a linear bushing and bushing housing comprising:
    providing a linear bushing having an exterior wall and an interior wall, the interior wall defining a longitudinal channel, and the linear bushing comprising at least one flange that extends substantially radially outwardly from the exterior wall of the bushing;
    providing a bushing housing comprising:
        a first housing block and a second housing block, each housing block defining a longitudinal bushing receiving channel, and
        hinge connection portions configured for hingedly connecting the housing blocks relative to each other, wherein the first and second housing blocks are moveable between an open position and a closed position about the hinge connection portions,
        the hinge connection portions are disposed on a first side of the longitudinal bushing receiving channel of each of the first and second housing blocks,
        the first and second housing blocks each define flange receiving surfaces on a second side of each longitudinal bushing receiving channel, the first sides being opposite the second sides relative to a longitudinal axis extending along a length of each longitudinal bushing receiving channel, and
        the second side of one of the first or second housing blocks comprises a male detent extending there from;

disposing the exterior wall of the linear bushing within the longitudinal bushing receiving channel of one of the first and second housing blocks when the housing blocks are in the open position; and rotating the first and second housing blocks about the hinged connection portions to position the first and second housing blocks in the closed position.

13. The method of claim 12 wherein:

the flange comprises two flanges that are spaced apart to define a channel there between, and disposing the exterior wall of the linear bushing within the longitudinal bushing receiving channels comprises aligning the male detent to extend into the channel defined by the flanges prior to rotating the housing blocks to the closed position.

14. The method of claim 12 wherein:

the hinged connection portions comprise:
- a tongue extending from a first side of the second housing block, and
- a groove defined within a first side of the first housing block; and providing the hinged bushing housing further comprises:
- inserting the tongue into the groove, and
- inserting a pin through the tongue and the groove, the housing blocks being rotatable about the pin.

15. The method of claim 12 comprising securing the first housing block and the second housing block into the closed position after rotating the housing blocks.

\* \* \* \* \*